(12) United States Patent
Chang et al.

(10) Patent No.: US 7,147,893 B2
(45) Date of Patent: Dec. 12, 2006

(54) METHOD OF AND APPARATUS FOR FORMING TRANSPARENT LAYER ON DISC SUBSTRATE, AND DISC THEREFROM

(75) Inventors: Do-hoon Chang, Seoul (KR); Myong-do Ro, Gyeonggi-do (KR); Du-seop Yoon, Gyeonggi-do (KR); Chang-min Park, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 10/218,040

(22) Filed: Aug. 14, 2002

(65) Prior Publication Data

US 2003/0039797 A1 Feb. 27, 2003

(30) Foreign Application Priority Data

Aug. 14, 2001 (KR) ............................... 2001-49032

(51) Int. Cl.
*B05D 3/12* (2006.01)

(52) U.S. Cl. ...................... 427/240; 427/282; 427/294; 427/425; 118/52; 118/320; 118/504; 118/505

(58) Field of Classification Search ................ 427/240, 427/425, 282, 294; 118/52, 320, 504, 505
See application file for complete search history.

(56) References Cited

U.S. PATENT DOCUMENTS

| | | | | |
|---|---|---|---|---|
| 5,191,218 | A * | 3/1993 | Mori et al. | 250/453.11 |
| 5,541,910 | A | 7/1996 | Tanaka et al. | 369/290 |
| 5,888,433 | A | 3/1999 | Amo | |
| 6,077,349 | A * | 6/2000 | Kikuchi | 118/52 |
| 2001/0018093 | A1* | 8/2001 | Decre | 427/58 |
| 2003/0054098 | A1* | 3/2003 | Chang et al. | 427/240 |

FOREIGN PATENT DOCUMENTS

| | | |
|---|---|---|
| JP | 11-213459 | 8/1998 |
| JP | 10-249264 | 9/1998 |
| JP | 10-289489 | 10/1998 |
| JP | 10-289489 A * | 10/1998 |
| JP | 11-25510 | 1/1999 |
| JP | 11-66647 | 3/1999 |
| JP | 11-86362 | 3/1999 |
| JP | 11-110818 | 4/1999 |
| JP | 11-195250 | 7/1999 |

(Continued)

OTHER PUBLICATIONS

JPO website computer translation of JP 10-289489 A, published Oct. 1998.*

*Primary Examiner*—Kirsten Jolley
(74) *Attorney, Agent, or Firm*—Stein, McEwen & Bui, LLP

(57) ABSTRACT

A disc is produced using a method of and an apparatus for forming a transparent layer on a disc substrate. The method for forming the transparent layer on the disc substrate includes covering an axial hole formed at a center of the disc substrate with a cover element by inserting a protrusion of the cover element in the axial hole of the disc substrate so that a resin does not leak through the axial hole, dispensing the resin toward the center of the disc substrate from an upper side of the disc substrate, and removing the cover element. A more uniform transparent layer can be obtained throughout the disc substrate.

4 Claims, 8 Drawing Sheets

FOREIGN PATENT DOCUMENTS

| | | |
|---|---|---|
| JP | 11-195251 | 7/1999 |
| KR | 1991-6652 | 8/1989 |
| KR | 2000-51973 | 8/2000 |
| KR | 2001-30714 | 4/2001 |

* cited by examiner

METHOD OF AND APPARATUS FOR FORMING TRANSPARENT LAYER ON DISC SUBSTRATE, AND DISC THEREFROM

CROSS-REFERENCE TO RELATED APPLICATIONS

This application claims the benefit of Korean Patent Application No. 2001-49032, filed Aug. 14, 2002, in the Korean Industrial Property Office, the disclosure of which is incorporated herein by reference.

BACKGROUND OF THE INVENTION

1. Field of the Invention

The present invention relates to a method of manufacturing a disc, and more particularly, to a method of and an apparatus for forming a transparent layer on a disc substrate, and a disc therefrom.

2. Description of the Related Art

FIG. 1 is a cross-sectional view of a convention optical disc. Referring to FIG. 1, the disc includes a disc substrate 10, a transparent layer 15, and an axial hole 14 formed at a center of the disc. In a case of a high density digital versatile disc (HD-DVD), a thickness T of the disc substrate 10 is 1.1 mm, and a thickness "d" of the transparent layer 15 is 0.1 mm, and thus a total thickness of the optical disc is 1.2 mm. In particular, in order to precisely focus a laser beam, which is radiated from a reproducing apparatus, on a surface of the transparent layer 15, the thickness "d" of the transparent layer 15 should be within a range of 100 µm±3 µm. Methods of forming the thin transparent layer 15 include a spin coating method.

FIG. 2 is a reference view illustrating a conventional spin coating method of forming a transparent layer 15 on a substrate 10. In the conventional spin coating method, a liquid ultraviolet hardening resin 13 is dropped at a point of a surface of the disc substrate 10, which rotates at a low speed, as shown in FIG. 2, and then, the disc substrate 10 is rotated at a high speed. The liquid ultraviolet hardening resin 13 is spread out along the surface of the disc substrate 10 in a radial direction by a centrifugal force to coat the disc substrate 10. Next, ultraviolet light is radiated onto the coated ultraviolet hardening resin 13, thereby hardening the ultraviolet hardening resin 13.

When forming the thin transparent layer 15 by the spin coating method, the thickness "d" of the transparent layer 15 depends on processing conditions such as a spinning speed, a spinning time, a dispensing position of the ultraviolet hardening resin 13, and a dispensing amount, and a property of the resin 13, such as viscosity. In particular, in order to coat the transparent layer 15 to the thickness T of 100 µm, the viscosity of the ultraviolet hardening resin 13 should be more than several centi-poise (cps). As the viscosity of the resin 13 increases, uniformity of the thickness "d" of the transparent layer 15 increases, and simultaneously, a molecular attraction increases, thereby affecting the discharged position of the ultraviolet hardening resin 13 on the disc substrate 10.

FIG. 3 is a graph illustrating a relationship between the dispensing position of a resin and the uniformity of the thickness of a layer. FIG. 3 presents the uniformity of the thickness of the transparent layer 15, which is generated when the ultraviolet hardening resin 13 is dispensed at the axial hole (center) and at 20 mm, 30 mm, 40 mm, and 45 mm of a radius, respectively, of the disc substrate 10 under conditions of the viscosity of 5000 cps, the dispensing amount of 5 g, and the spinning speed of 700 rpm. As shown in FIG. 3, the thickness of the transparent layer 15 is most uniform when the ultraviolet hardening resin 13 is dispensed at the center (axial hole 14) of the disc substrate 10.

However, as mentioned above, in the conventional spin coating method, the ultraviolet hardening resin is not dispensed at a center of the disc substrate but at a point of the surface of the disc substrate.

SUMMARY OF THE INVENTION

To solve the above and other problems, it is an object of the present invention to provide a method of and an apparatus for forming a transparent layer on a disc substrate, in which a resin is dispensed at a center of the disc substrate, thereby forming a transparent layer having higher uniformity, and a disc therefrom.

It is another object of the present invention to provide a method of and an apparatus for forming a transparent layer on a disc substrate, in which a wider recording surface can be obtained, and a disc therefrom.

Additional objects and advantageous of the invention will be set forth in part in the description which follows and, in part, will be obvious from the description, or may be learned by practice of the invention.

Accordingly, to achieve the above and other objects, there is provided a method of forming a transparent layer on a disc substrate. The method includes (a) covering an axial hole formed at a center of the substrate with a cover element by inserting a protrusion of the cover element in the axial hole of the disc substrate so that a resin does not leak through the axial hole, (b) dispensing the resin toward the center of the disc substrate from an upper side of the disc substrate, and (c) removing the cover element from the substrate.

According to an aspect of the present invention, the method further includes (a0) inserting an central axle protruding from a spindle table in the axial hole of the disc substrate and mounting the disc substrate in a rotation support board installed around the central axle, wherein a first sum of a height of the rotation support board and a thickness of the disc substrate is equal to or greater than a second sum of a length of the central axle and a length of the protrusion of the cover element.

According to another aspect of the present invention, the method further includes (a1) closely placing the disc substrate and the rotation support board on the spindle table. In the closely placing of the disc substrate on the rotation support, air contained in a first space between the disc substrate and the rotation support board flows out through at least one hollow formed in the rotation support board to form a vacuum state in the first space between the disc substrate and the rotation support board in order to closely place the disc substrate on the rotation support board on the spindle table, or air contained in a second space between the cover element and the rotation support board flows out through at least one hollow formed in the central axle to form a vacuum state in the second space between the cover element and the central axle in order to closely place (attach) the disc substrate and the rotation support board on the spindle table. The method may include attaching the cover element and the central axis using a magnet, which is mounted in an internal side of the central axle. With this feature, the disc substrate and the rotation support board are closely placed on the spindle table.

According to still another aspect of the present invention, the method further includes rotating the disc substrate to uniformly coat the resin onto the disc substrate and hardening the coated resin.

To achieve the above and other objects, there is provided an apparatus for forming the transparent layer on the disc substrate. The apparatus includes a supporting portion which supports the disc substrate so that the disc substrate is mounted and rotates, and a resin dispensing portion which dispenses the resin toward the center of the disc substrate.

According to yet another aspect of the present invention, the supporting portion includes the cover element having the protrusion formed to cover the axial hole so that the resin dose not leak through the axial hole formed at the center of the disc substrate.

According to still yet another aspect of the present invention, the supporting portion includes a spindle motor, the spindle table having a side connected to the spindle motor, and the central axle connected to the spindle motor through the spindle table to pass through the spindle table and to protrude from an opposite side of the spindle table, and a rotation support board arranged around the central axle of the spindle table, on which the disc substrate is mounted.

According to a further aspect of the present invention, the first sum of the height of the rotation support board and the thickness of the disc substrate is equal to or greater than the second sum of the length of the central axle and the length of the protrusion.

According to another an aspect of the present invention, at least one hollow through which air flows out to form the vacuum state in a first space between the disc substrate and the rotation support board in order to closely attach the disc substrate and the rotation support board each other, is formed in the rotation support board, or at least one hollow through which air flows out to form the vacuum state in the second space between the cover element and the central axle in order to closely attach the disc substrate and the rotation support board to each other, is formed in the central axle. A magnet attaching the cover element and the central axle to closely attach the disc substrate and the rotation support board each other, may be mounted in the internal side of the central axle. In particular, it is possible that the rotation support board is coated with a predetermined material so that a residue is easily removed from the rotation support board.

BRIEF DESCRIPTION OF THE DRAWINGS

These and other objects and advantageous of the invention will become apparent and more readily appreciated from the following description of the preferred embodiments, taken in conjunction with the accompanying drawings of which.

DETAILED DESCRIPTION OF THE PREFERRED EMBODIMENTS

Figure 1:
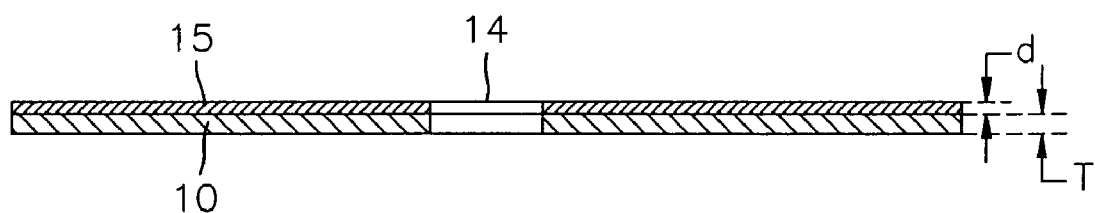
FIG. 1 is a cross-sectional view of a conventional disc.
Figure 2:
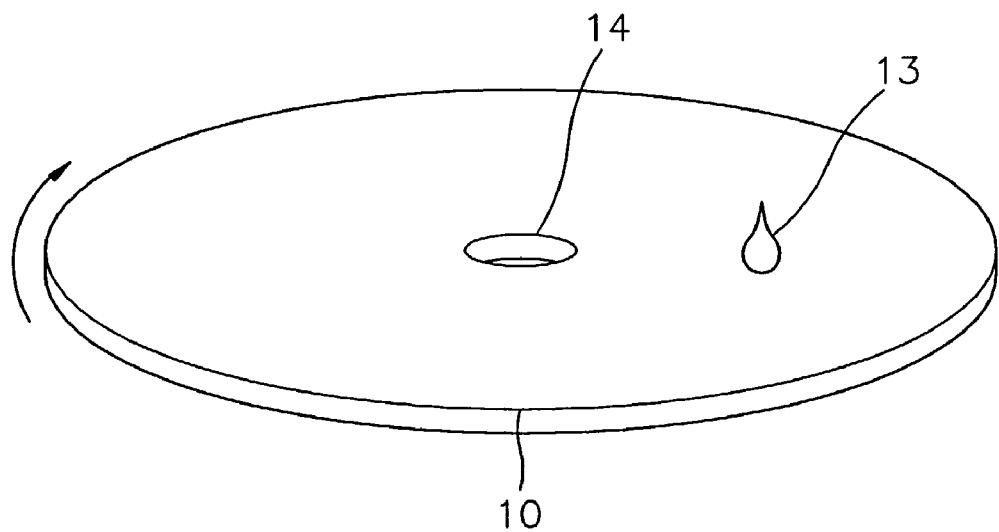
FIG. 2 is a view illustrating a conventional spin coating method of forming the conventional disc of FIG. 1.
Figure 3:
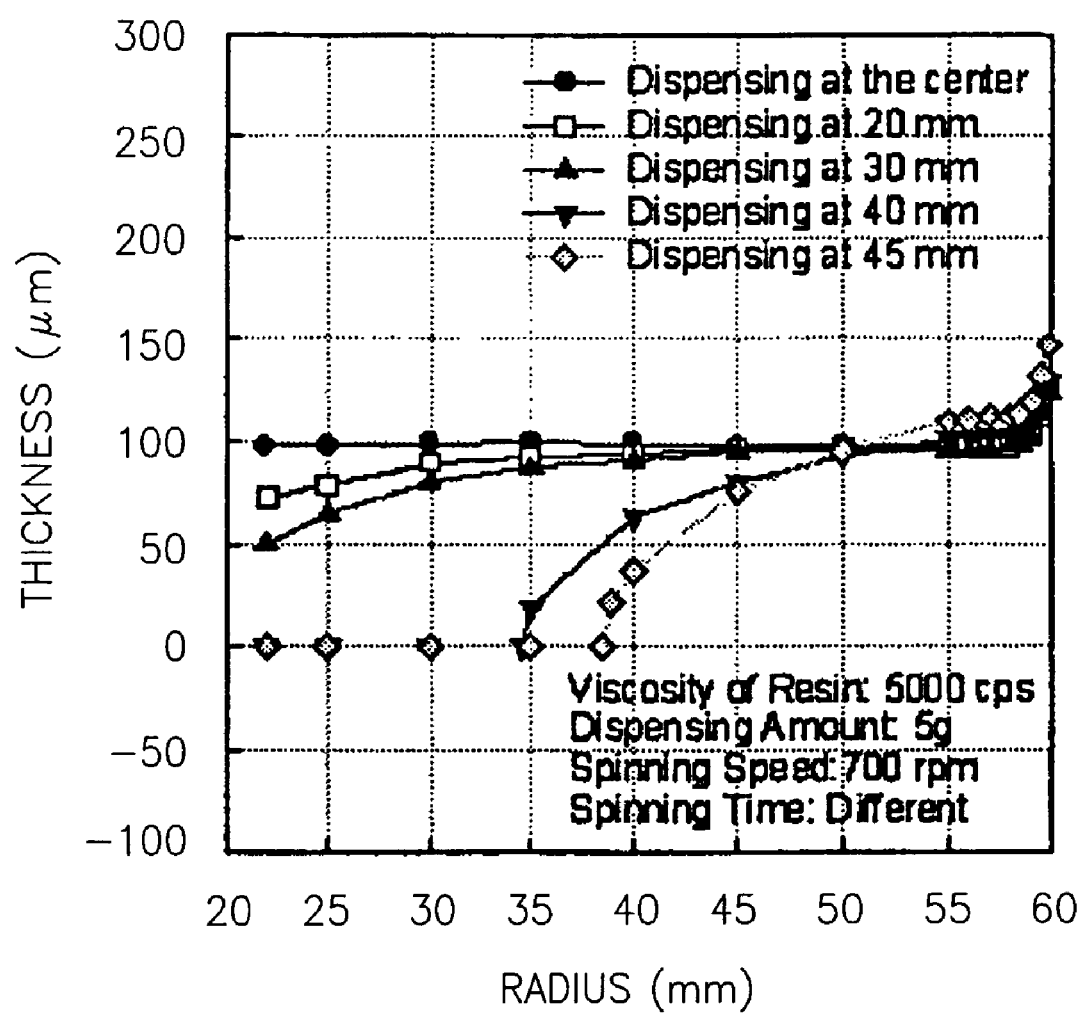
FIG. 3 is a graph illustrating a relationship between a dispensing position of a resin and the uniformity of a thickness of a transparent layer of a disc.

Reference will now be made in detail to the present preferred embodiments of the present invention, examples of which are illustrated in the accompanying drawings, wherein like reference numerals refer to the like elements throughout. The embodiments are described in order to explain the present invention by referring to the figures.

Hereinafter, embodiments of the present invention will be described in detail with reference to the accompanying drawings.

Figure 4A:
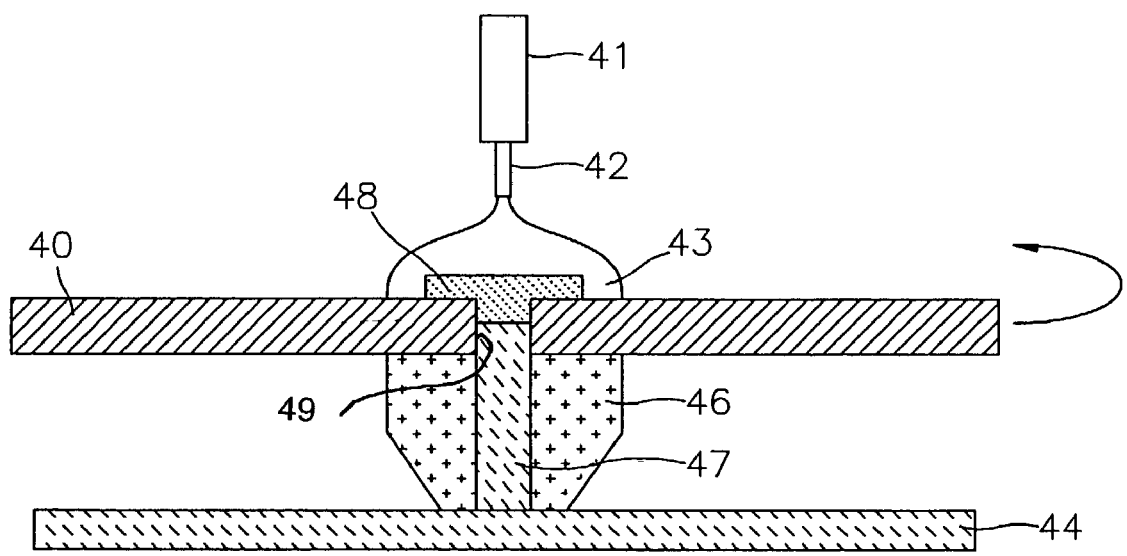
FIGS. 4A and 4B are partial cross-sectional views of an apparatus for forming a transparent layer according to a first embodiment of the present invention.
Figure 4B:
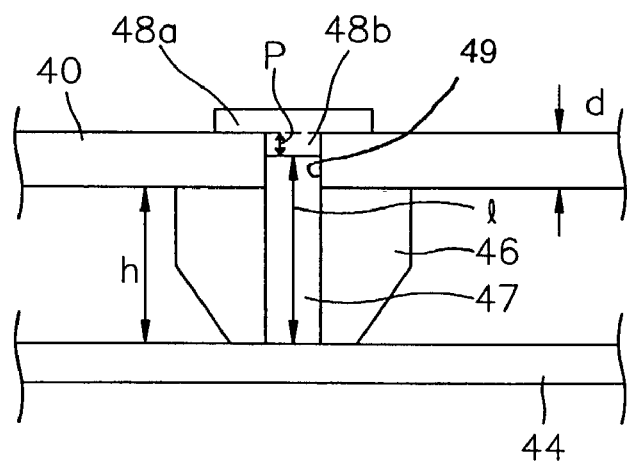

FIGS. 4A and 4B are partial sectional views of an apparatus for forming a transparent layer according to a first embodiment of the present invention. Referring to FIGS. 4A and 4B, the apparatus for forming a transparent layer includes a resin dispensing portion dispensing a resin 43 and a supporting portion supporting a rotating disc substrate 40. The resin dispensing portion includes a dispensing header 41 and a dispensing nozzle 42 through which the resin 43 is dispensed. The supporting portion includes a spindle motor (not shown), a spindle table 44 connected to the spindle motor through a central axle 47, and a rotation support board 46, which surrounds the central axle 47 on the spindle table 44. The rotation support board 46 is not limited to a specific material, and plastics and metals may be used for the rotation support board 46.

In the first embodiment, the central axle 47 is projected to an external side of the rotation support board 46 so that the central axle 47 is inserted in an axial hole 49, which is formed in a center of the disc substrate 40, and the rotation support board 46 supports the disc substrate 40. A radius of the rotation support board 46 is smaller than that of the disc substrate 40. A cover element 48 is installed in an axial hole, which is formed at the center of the disc substrate 40. The cover element 48 covers the axial hole 49 so that the resin 43 does not leak into the axial hole 49 when the resin 43 is dispensed. The cover element 48 includes a header 48a and a protrusion 48b. When the cover element 48 is mounted on the disc substrate 40, a lower side of the header 48a is closely attached onto a surface of the disc substrate 40, and the protrusion 48b is inserted in the axial hole 49. A radius of the header 48a is greater than that of the axial hole 49 so as to cover the axial hole 49. The protrusion 48b prevents the disc substrate 40 from shaking when the disc substrate 40 rotates at a high speed.

In particular, in the first embodiment, a first sum of a height h of the rotation support board 46 and a thickness d of the disc substrate 40 is equal to or greater than a second sum of a length l of the central axle 47 and a length p of the protrusion 48b, and the length p of the protrusion 48b is equal to or smaller than the thickness d of the disc substrate 40. This is expressed by Equation 1.

$$h+d \geq l+p,$$

and $$d \geq p \tag{1}$$

In order to rotate the disc substrate 40 by the spindle motor at a high speed, the disc substrate 40, the rotation support board 46, and the spindle table 44 are closely attached to one another. In order to closely attach the disc substrate 40 to a spindle table 44 during rotation of the spindle motor, air between the disc substrate 40 and the spindle table 44 flows out to obtain a vacuum state. The method can be applied to the present invention, and thus a configuration implementing the method is as below.

Figure 5:
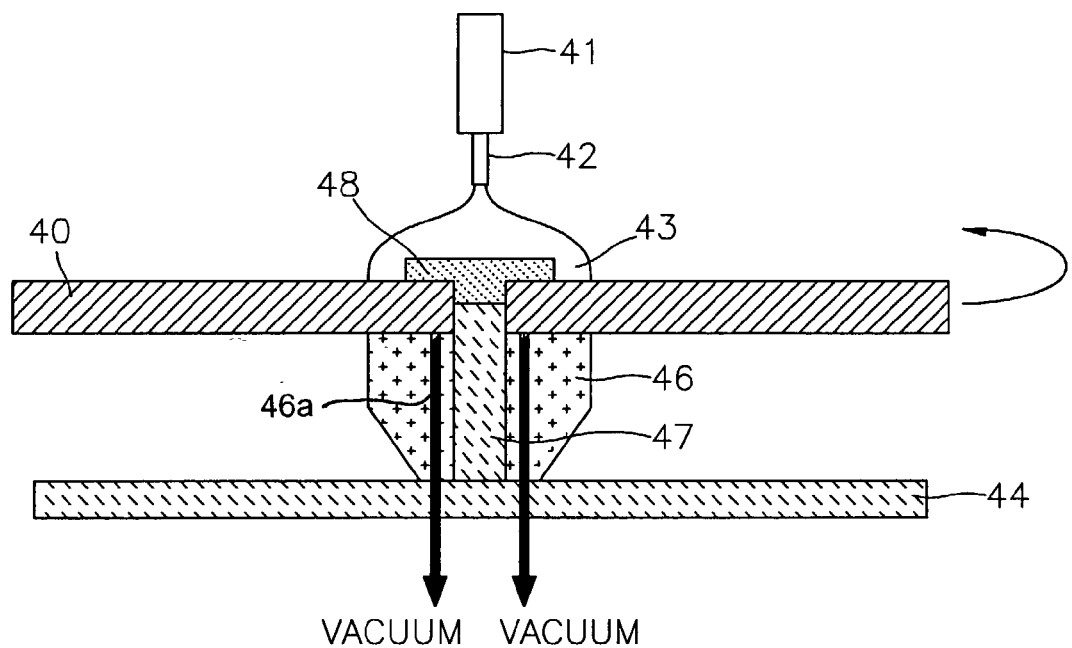
FIGS. 5 through 7 are views illustrating a method of closely placing a disc substrate on a spindle table in the apparatus of FIGS. 4A and 4B.

Referring to FIG. 5, at least one hollow 46*a* communicates with the rotation support board 46 and the spindle table 44. As a result, air flows out to an external side of the spindle table 44, and the vacuum state is formed between the cover element 48 and the rotation support board 46, and thus the disc substrate 40 and the rotation support board 46 are closely placed on the spindle table 44.

Figure 6:
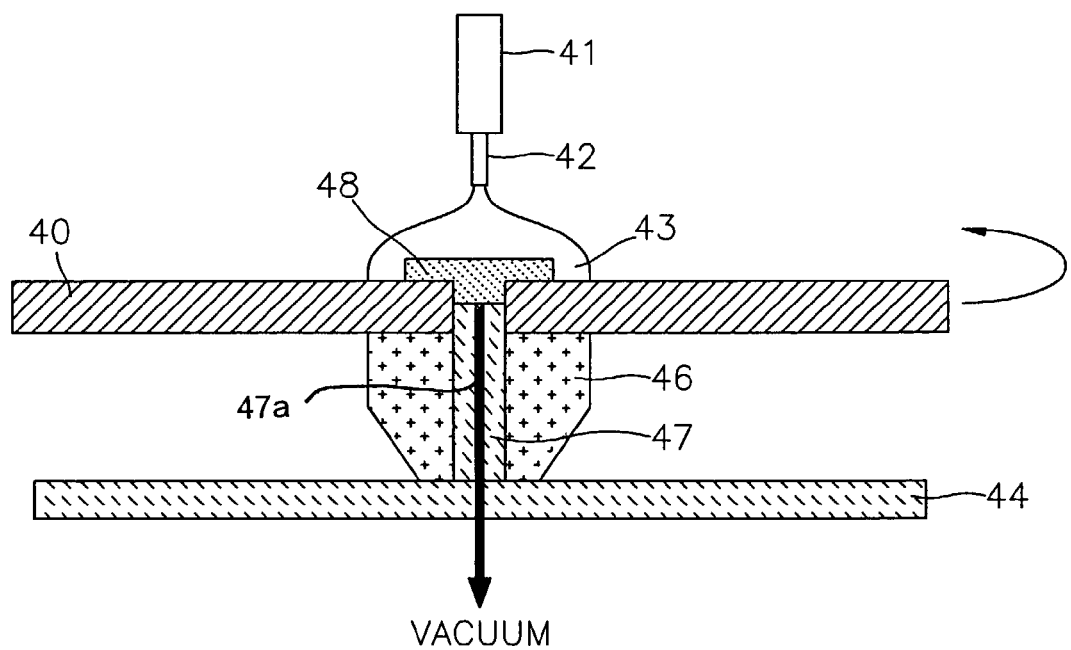

Referring to FIG. 6, at least one hollow 47*a* communicates with the central axle 47 and the spindle table 44. As a result, air flows out toward the external side of the spindle table 44, and the vacuum state is formed between the cover element 48 and the central axle 47, and thus the disc substrate 40 and the rotation support board 46 are closely placed on the spindle table 44.

Figure 7:
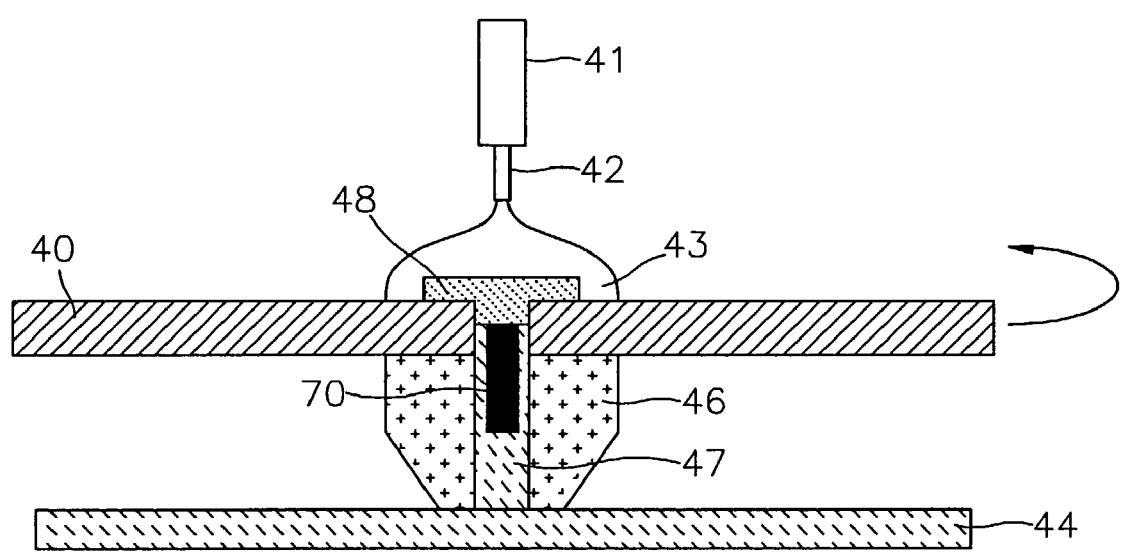

FIG. 7 illustrates another method of closely attaching the disc substrate 40 and the rotation support board 46 to the spindle table 44. Referring to FIG. 7, a magnet 70 is mounted in an internal side of the central axle 47. In order to increase a magnetic force of the mounted magnet 70, the magnet 70 is preferably an electromagnet. As a result, the cover element 48 and the central axle 47 is closely attached to each other, and thus, the disc substrate 40 and the rotation support board 46 are closely placed on the spindle table 44.

Figure 8A:
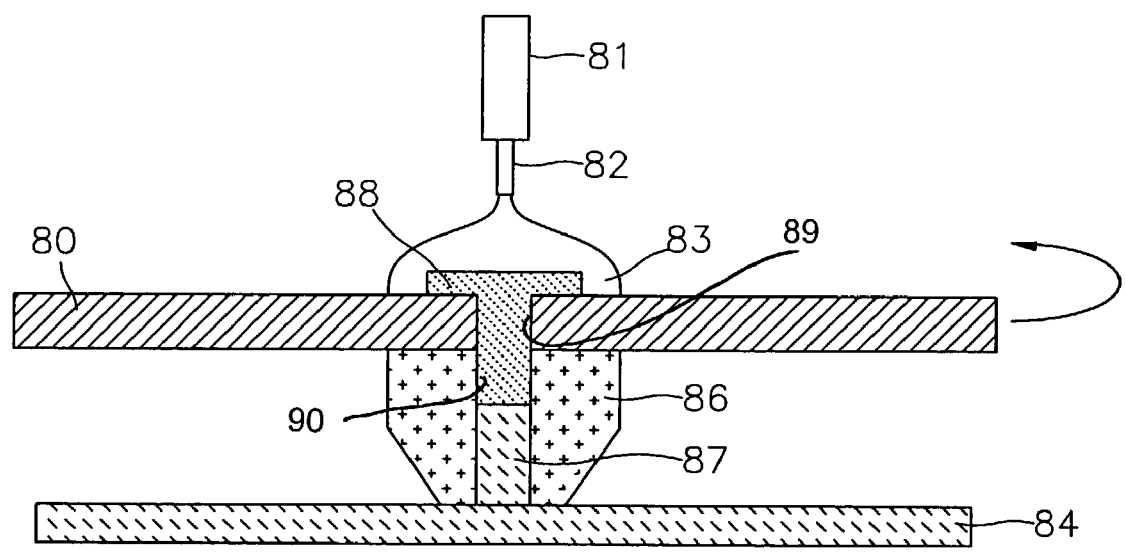
FIGS. 8A and 8B are partial cross-sectional views of the apparatus for forming a transparent layer according to a second embodiment of the present invention.
Figure 8B:
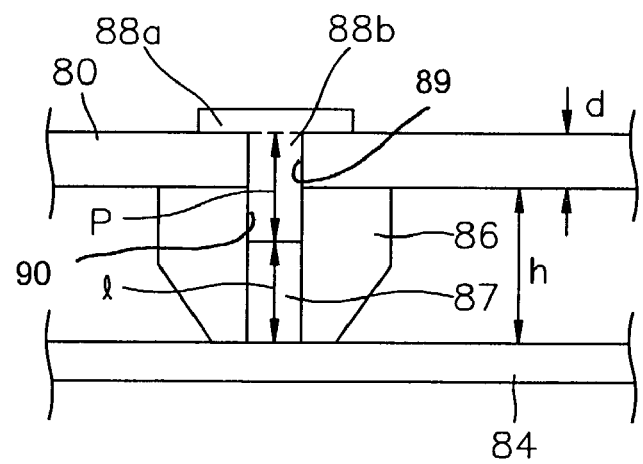

FIGS. 8A and 8B are partial cross-sectional views of another apparatus for forming the transparent layer according to a second embodiment of the present invention. Referring to FIGS. 8A and 8B, the apparatus for forming the transparent layer includes a resin dispensing portion dispensing a resin 83 and a supporting portion supporting a disc substrate 80 so that the disc substrate 80 is mounted and rotates. The resin dispensing portion includes a dispensing header 81 and a dispensing nozzle 82 through which the resin 83 are dispensed. The supporting portion includes a spindle motor (not shown), a spindle table 84 connected to the spindle motor through a central axle 87, and a rotation support board 86 surrounding the central axle 87 on the spindle table 84.

In the second embodiment, the central axle 87 is mounted in an internal side of the rotation support board 86. An insertion hole 90 is formed at a center of the rotation support board 86. A radius of the rotation support board 86 is smaller than that of the disc substrate 80. A cover element 88 is installed in the insertion hole 90 after the disc substrate 80 is mounted so that an axial hole 89 formed at a center of the disc substrate 80 is connected to the insertion hole 90 formed in the rotation support board 86. The cover element 88 covers the axial hole 89 so that the resin 83 does not leak through the axial hole 89 when the resin 83 is dispensed. The cover element 88 also includes a header 88*a* and a protrusion 88*b*. When the cover element 88 is mounted on the disc substrate 80, a lower side of the header 88*a* is closely placed on an upper surface of the disc substrate 80, and the protrusion 88*b* is inserted in the axial hole 89, which is formed on the disc substrate 80, and in the insertion hole 90, which is formed in the rotation support board 86. A radius of the header 88*a* is greater than that of the axial hole 89 so as to cover the axial hole 89. The protrusion 88*b* passes through the disc substrate 80 to be inserted into the rotation support board 86, thereby preventing the disc substrate 80 from shaking when the disc substrate 80 rotates at a high speed.

Also, in the second embodiment, the first sum of the height h of the rotation support board 86 and the thickness d of the disc substrate 80 is equal to or greater than the second sum of the length l of the central axle 87 and the length p of the protrusion 88*b*, and the length p of the protrusion 88*b* is greater than the thickness d of the disc substrate 80. This is expressed by Equation 2.

$$h+d \geq l+p,$$

and $$p>d \tag{2}$$

In order to rotate the disc substrate 80 by the spindle motor at the high speed, the disc substrate 80, the rotation support board 86, and the spindle table 84 is closely placed on one another. The configuration of the supporting portion is the same as that of the supporting portion of the first embodiment described in FIGS. 5 through 7.

Figure 9A:
FIGS. 9A through 9D are various cross-sectional views of a cover element of the apparatus of FIGS. 4A–8B.
Figure 9B:
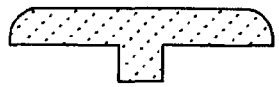
Figure 9C:
Figure 9D:

FIGS. 9A through 9D are various cross-sectional views of a cover element according to another embodiment of the present invention. Referring to FIGS. 9A through 9D, unlike the above-mentioned cover element of the first and second embodiments, the cover element can be manufactured in various shapes. Referring to FIG. 9A, the header of the cover element has a disc shape as an isosceles trapezoid. Referring to FIGS. 9B and 9C, the header of the cover element has a disc shape, in which a cross-section of the header has a semi-ellipse shape. FIG. 9D shows the cover element in which only a protrusion without a header is formed.

The material of the cover element is not limited, and plastics and metals may be used for the cover element. In order to reduce a barr of a transparent layer occurring when the cover element is removed by minimizing the amount of a resin remaining in the cover element, the cover element is preferably coated with a material minimizing a surface tension of the cover element, i.e., Teflon.

Figure 10:
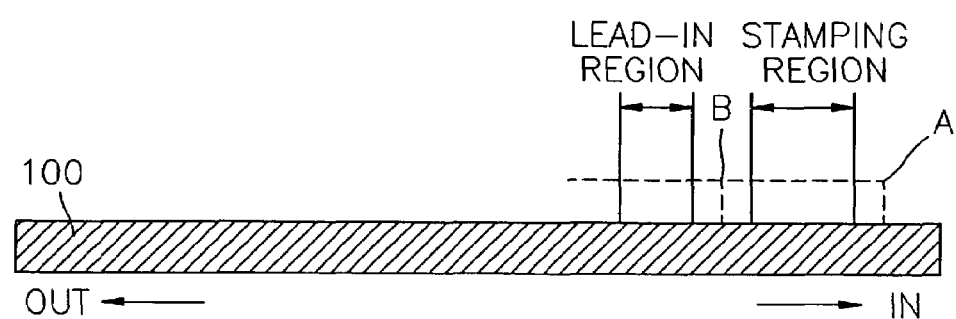
FIG. 10 is a view illustrating the disc formed using the cover element in the apparatus of FIGS. 4A–8B.

FIG. 10 is a cross-sectional view illustrating a disc formed using the cover element according to the present invention. Referring to FIG. 10, respective size of a lead-in region and a clamping region of the disc is one of critical factors affecting the size of the cover element. In other words, a surface of the clamping region should be uniform, and thus, a starting portion of the transparent layer should not be included in the clamping region. The clamping region of the disc is clamped by a clamper when the disc is rotated by a spindle motor. Since data should be recorded in the lead-in region, the transparent layer should be formed on the lead-in region. Considering this, an end of the transparent layer may be formed at a point A in which a stamping region begins from the center of the disc substrate 100 or at a point B between the stamping region and the lead-in region.

Some specifications of discs, which are being manufactured or to be manufactured, are as follows.

| Diameter | φ 120 mm | φ 80 mm | φ 45 mm |
|---|---|---|---|
| Lead-in region | φ 33–36 mm | φ 33–36 mm | φ 33–36 mm |
| Clamping region | φ 23–26 mm | φ 23–26 mm | φ 23–26 mm |
| Axial hole (central hole) | φ 15 mm | φ 15 mm | φ 15 mm |
| Capacity | 25 GB | 7.8 GB | 650 MB |

In a case that the transparent layer having the thickness of 0.1 mm is formed on respective ones of the disc substrates by using a ultraviolet hardening resin having 5000 cps of viscosity in consideration of the above conditions in the case of the point A, preferably, the header of the cover element has a diameter of less than φ22 mm and the thickness of less than 0.35 mm. In the case of the point B, preferably, the diameter of the header of the cover element is less than φ27–32 mm, and the thickness of the header of the cover element is less than 0.35 mm. The cover element becomes thicker when the viscosity of the ultraviolet hardening resin decreases, and on the contrary, the cover element becomes thinner when the viscosity of the ultraviolet hardening resin increases.

A method of forming the transparent layer of the disc substrate according to another embodiment of the present invention will be described below.

Figure 11:
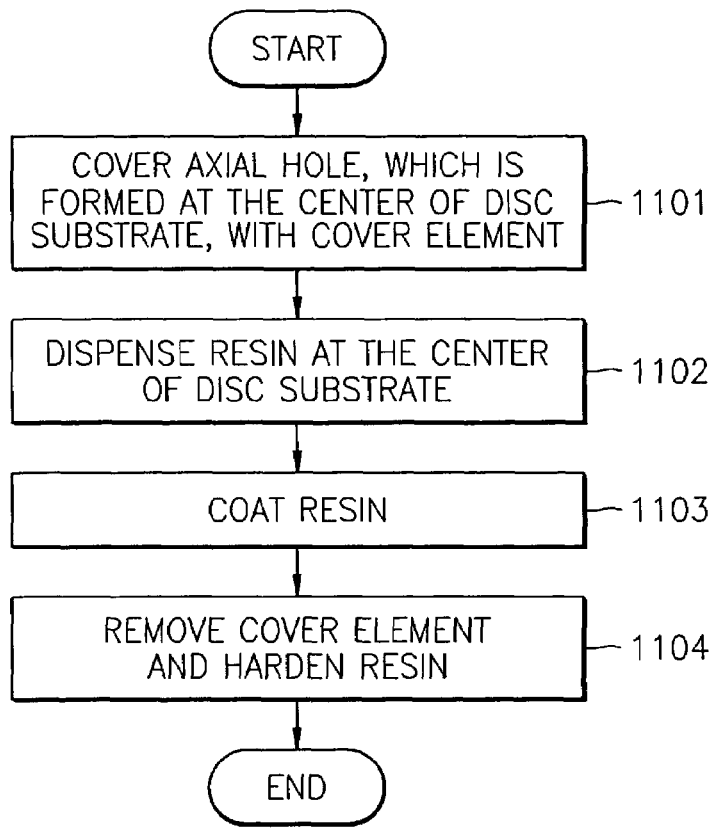
FIG. 11 is a flow chart illustrating a method of forming the transparent layer.

FIG. 11 is a flow chart illustrating the method of forming the transparent layer. Referring to FIG. 11, in operation 1101, the disc substrate 40, 80 is mounted on the spindle table 44, 84 such that a major surface of the disc substrate 40, 80 on which the transparent layer is to be formed faces upward, and then, the axial hole 49, 89, which is formed at the center of the disc substrate 40, 80, is covered with the cover element 48, 88. Next, in operation 1102, the disc substrate 40, 80 is rotated at a low speed by using a rotating force of the spindle motor, and the predetermined amount of an ultraviolet hardening resin 43, 83 is dispensed toward the center of the disc substrate 40, 80 through the dispensing nozzle 42, 82 of the dispensing header 41, 81. Next, the disc substrate 40, 80, which is mounted on the spindle table 44, 84, is rotated at a high speed by controlling the spindle motor. In operation 1103, the ultraviolet hardening resin 43, 83 is spread out the disc substrate 40, 80 in the radial direction by centrifugal force caused by rotation to uniformly coat the entire surface of the disc substrate 40, 80. In operation 1104, ultraviolet is radiated on the resin 43, 83 after the cover element 48, 88 is removed, thereby hardening the resin 43, 83, or the cover element 48, 88 is removed after the resin 43, 83 is hardened.

Figure 12A:
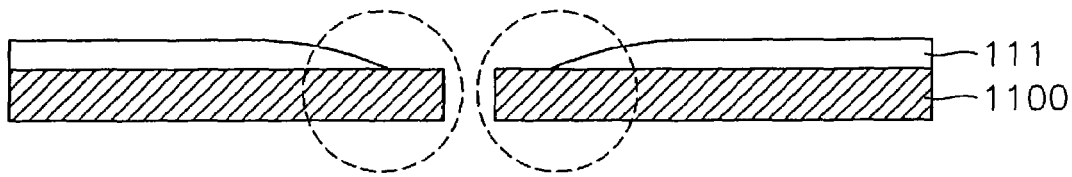
FIGS. 12A and 12B are cross-sectional views illustrating a section of a transparent layer formed according to prior art and a section of a transparent layer formed according to the present invention, respectively.
Figure 12B:
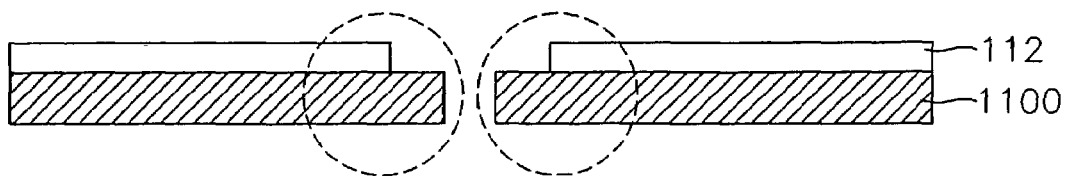

FIGS. 12A and 12B are cross-sectional views illustrating a section of a transparent layer formed according to conventional apparatus and method and the section of a transparent layer formed according to the present invention, respectively. FIG. 12A illustrates a conventional transparent layer, and FIG. 12B illustrates a transparent layer according to the present invention. In FIG. 12A, the resin is dispensed at a point of the surface of a disc substrate 1100 without using the cover element, and thus, the thickness of the starting portion of a transparent layer 111 is not uniform. However, according to the present invention, the cover element is mounted on the disc substrate 1100, and then, the resin is dispensed toward the axial hole (central hole) of the disc substrate 1100, and then, the cover element is removed, and thus, the thickness of the transparent layer 112 is uniform.

Measured values required to form the disc using the method of manufacturing the disc according to the present invention are as follows.
<Conditions for Manufacturing a Disc>
Stamper:
Track pitch in-groove type 0.32 μm; and
The stamper records tracks at the radius of 22–60 mm to check transfer property.
Injection Molding:
Transfer is good to 58.5 mm of a radius when the disc substrate having 120 mm of a diameter and 1.1 mm of a thickness shown in FIG. 1 is injected.
Condition for Injection
Temperature of fixing mold: 125° C., temperature of moving mold: 125° C.;
Temperature of sprue bush: 90° C., temperature of a resin: maximum 380° C.;
Forces such as 35 ton/sec, 25 ton/sec, and 10 ton/sec, are required to make the form of mold; and
Injection molding is performed on these conditions. As a result of injection molding, the property of a molding machine is less than 0.3° C., and the streaming flow of a resin is stable to edges of a mask.
Sputtering:
Precision of an external mask: r=59.7±0.2 mm, thickness of edges of a mask (nonuniform region): 0.2 mm, and four-layer structure: Ag Alloy/ZnSSiO$_2$/SbGeTe/ZnS-SiO$_2$.
Spin Coating:
The axial hole of a disc substrate is covered by a cover element having 22–44 mm of a diameter and 0.24–0.78 mm of a thickness having various shapes, spin coating is performed on the axial hole on the same conditions, and in most cases, the thickness of 100 μm±2 μm and uniformity are obtained to 17–57 mm of a radius.
Conditions for Spin Coating
Viscosity: 500 cps, spinning time: 60–70 sec, spinning speed: 700 rpm, and hardening time: 3 sec using a lamp of 3000 W.
Result of Recording and Reproducing Experiment:
The uniform property is obtained to 17–58 mm of a radius.

As described above, the present invention can provide the cover element, thereby enabling a central dispensing method of dispensing the resin at the axial hole of the disc substrate. As a result, the thickness of the transparent layer becomes more uniform on the entire region of the disc substrate. Moreover, as a recording region increases, a recording capacity increases. When the rotation support board is installed and when the cover element is provided to the conventional spin coating apparatus, the apparatus and method according to the present invention can be implemented in conventional equipment, thereby increasing a using efficiency of the conventional equipment.

Although a few preferred embodiments of the present invention have been shown and described, it would be appreciated by those skilled in the art that changes may be made in this embodiment without departing from the principles and sprit of the invention, the scope of which is defined in the claims and their equivalents.

What is claimed is:

1. A method of forming a transparent layer on a disc substrate, supported above a spindle table by a rotation support board and a central axle, having an axial hole formed at a center of the disc substrate, the method comprising:

covering the axial hole with a cover element by inserting a protrusion of the cover element in the axial hole of the disc substrate;

securing the disc substrate to the spindle table by creating an air flow from either just below the disc substrate through the rotation support board and the spindle table or just below the cover element through the central axle and the spindle table;

dispensing a resin toward the center of the disc substrate from a side of the disc substrate; and removing the cover element from the axial hole of the disc substrate.

2. The method of claim 1, wherein the central axle, which protrudes from the spindle table, and the rotation support board, which is installed around the central axle, comprise a transparent layer forming apparatus, and wherein the covering of the axial hole comprises:

inserting the central axle into the axial hole of the disc substrate; and mounting the disc substrate on the rotation support board to be in line with the central axle, wherein a first sum of a height of the rotation support board and a thickness of the disc substrate is equal to or greater than a second sum of a length of the central axle and a length of the protrusion.

3. The method of claim 2, wherein the transparent layer forming apparatus comprises a hollow hole formed in the rotation support board, and the attaching of the disc substrate to the rotation support board comprises:

flowing air out through the hollow hole of the rotation support board to form a vacuum state in a space between the disc substrate and the rotation support board in order to closely place the place the disc substrate on the rotation support board on the spindle table.

4. The method of claim 1, wherein the dispensing of the resin comprises:

rotating the disc substrate to uniformly coat the resin onto the disc substrate; and hardening the coated resin.

* * * * *